(12) United States Patent
Krais et al.

(10) Patent No.: US 12,334,777 B2
(45) Date of Patent: Jun. 17, 2025

(54) STATOR HOUSING FOR AN ELECTRICAL MACHINE, ELECTRICAL MACHINE FOR A VEHICLE, AND VEHICLE

(71) Applicant: Valeo Siemens eAutomotive Germany GmbH, Erlangen (DE)

(72) Inventors: Nils Krais, Strahlungen (DE); Philipp Söntgerath, Niederkrüchten (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 290 days.

(21) Appl. No.: 17/783,371

(22) PCT Filed: Dec. 3, 2020

(86) PCT No.: PCT/EP2020/084361
§ 371 (c)(1),
(2) Date: Jun. 8, 2022

(87) PCT Pub. No.: WO2021/115895
PCT Pub. Date: Jun. 17, 2021

(65) Prior Publication Data
US 2023/0013463 A1 Jan. 19, 2023

(30) Foreign Application Priority Data
Dec. 9, 2019 (DE) ...................... 10 2019 133 548.5

(51) Int. Cl.
*H02K 5/18* (2006.01)
*H02K 1/20* (2006.01)
(Continued)

(52) U.S. Cl.
CPC ................. *H02K 1/20* (2013.01); *H02K 9/19* (2013.01); *H02K 5/18* (2013.01); *H02K 5/203* (2021.01)

(58) Field of Classification Search
CPC ........... H02K 1/20; H02K 5/18; H02K 5/203; H02K 9/19
See application file for complete search history.

(56) References Cited

U.S. PATENT DOCUMENTS

| 6,727,611 B2 | 4/2004 | Bostwick |
| 2012/0217826 A1 | 8/2012 | Jiang et al. |

(Continued)

FOREIGN PATENT DOCUMENTS

| CN | 105099082 A | 11/2015 |
| CN | 208226747 U | 12/2018 |

(Continued)

OTHER PUBLICATIONS

International Search Report and Written Opinion in corresponding International Application No. PCT/EP2020/084361, mailed Feb. 17, 2021 (12 pages).

(Continued)

*Primary Examiner* — Gary A Nash
(74) *Attorney, Agent, or Firm* — Osha Bergman Watanabe & Burton LLP

(57) ABSTRACT

Stator housing for an electrical machine having an inlet and outlet for a cooling fluid, and a cooling duct formed between the inlet and the outlet through which the cooling fluid flows in a direction from the inlet to the outlet, is disclosed. The cooling duct has a first and a second heat transfer arrangement, which each extend along the direction of flow and are designed to transfer heat from the cooling fluid to the stator housing. The first heat transfer arrangement is arranged in a first section of the cooling duct and the second is arranged in a second section that is on the inlet side with respect to the first section. The first heat transfer arrangement in the first (Continued)

section creates a larger heat transfer area for the cooling fluid per unit of length based on the direction of flow than the second in the second section.

15 Claims, 7 Drawing Sheets

(51) Int. Cl.
    *H02K 5/20*     (2006.01)
    *H02K 9/19*     (2006.01)

(56)         References Cited

U.S. PATENT DOCUMENTS

| | | | |
|---|---|---|---|
| 2013/0126143 A1 | 5/2013 | Sheu et al. | |
| 2014/0033702 A1* | 2/2014 | Limbeck | F28F 13/06 165/104.11 |
| 2015/0015096 A1* | 1/2015 | Huber | H02K 5/203 310/54 |
| 2015/0130302 A1* | 5/2015 | Leberle | H02K 9/197 310/54 |
| 2017/0244305 A1* | 8/2017 | Ploeger | H02K 5/06 |
| 2019/0305615 A1 | 10/2019 | Yamada | |

FOREIGN PATENT DOCUMENTS

| | | |
|---|---|---|
| CN | 208571804 U | 3/2019 |
| CN | 209170109 U | 7/2019 |
| DE | 102009050090 A1 | 4/2011 |
| DE | 102016216019 A1 | 3/2018 |
| DE | 102018117176 A1 | 1/2020 |
| EP | 2940835 A1 | 11/2015 |
| EP | 3076526 A1 | 10/2016 |
| EP | 3358721 A1 | 8/2018 |
| EP | 3621183 A1 | 3/2020 |
| JP | 2003-199293 A | 7/2003 |
| JP | 2004-194362 A | 7/2004 |
| JP | 2016-135049 A | 7/2016 |
| WO | 2015-178087 A1 | 11/2015 |

OTHER PUBLICATIONS

German Search Report in corresponding German Application No. 10 2019 133 548.5, Dated Nov. 13, 2020 (8 pages).
Office Action issued in Corresponding JP Application No. 2022-534863, dated Oct. 18, 2024 (21 pages with English Translation).

* cited by examiner

STATOR HOUSING FOR AN ELECTRICAL MACHINE, ELECTRICAL MACHINE FOR A VEHICLE, AND VEHICLE

The present invention relates to a stator housing for an electrical machine, comprising an inlet for a cooling fluid, an outlet for the cooling fluid, a cooling duct, which is formed between the inlet and the outlet and through which the cooling fluid can flow in a direction of flow directed from the inlet to the outlet.

In addition, the invention relates to an electrical machine for a vehicle.

Electrical machines heat up during their operation owing to electrical losses in windings of their stator. Inadmissibly high temperatures can lead to a thermal fault in the windings. To increase the utilization of the electrical machine, particularly in the case of use as drive machines in a vehicle, there is a known practice of providing a cooling duct in a stator housing of the electrical machine, said duct dissipating heat from the stator to a cooling fluid.

Such a stator housing is known from document EP 3 358 721 A1, which discloses a housing for an electrical machine having a fluid duct for receiving a fluid for cooling the electrical machine, having a fluid connection which comprises an inlet and an outlet, and having a housing wall. The housing wall has an axial extent between two end faces along a first spatial direction and a radial extent with a radius of extent along two further spatial directions. The fluid duct is part of a cooling jacket which extends over the entire housing wall.

When the cooling fluid flows through the cooling duct, the temperature distribution is such that the temperature rises from the inlet to the outlet. This leads to non-uniform heat dissipation from the stator.

It is the underlying object of the invention to make the temperature distribution along a cooling duct of a stator housing more uniform.

To achieve this object, the proposal according to the invention, in the case of a stator housing of the type stated at the outset, is that the cooling duct has a first heat transfer arrangement and a second heat transfer arrangement, which each extend along the direction of flow and are designed to transfer heat from the cooling fluid to the stator housing, wherein the first heat transfer arrangement is arranged in a first section of the cooling duct and the second heat transfer arrangement is arranged in a second section of the cooling duct that is on the inlet side with respect to the first section, wherein the first heat transfer arrangement in the first section creates a larger heat transfer area for the cooling fluid per unit of length based on the direction of flow than the second heat transfer arrangement in the second section.

The invention is based on the concept of making the heat transfer area with respect to length on the outlet side larger than on the inlet side. Thus, if the already heated cooling fluid flows into the first section situated on the outlet side, the heat dissipation to the cooling fluid by the first heat transfer arrangement is increased, thereby making it possible to compensate for an inherently poorer heat transfer due to the relatively low temperature difference between the stator components from which heat is to be dissipated and the cooling fluid. This advantageously enables the temperature distribution along the stator housing to be made more uniform.

Typically, the first section and/or the second section each occupy at least 10%, preferably at least 20%, particularly preferably at least 30%, of the length of the cooling duct. The sections of the cooling duct can directly adjoin one another or it is possible to provide a transitional section, associated with neither of the sections, between the sections. The sections are expediently free of overlap. The cooling duct typically has an inner boundary surface which extends in the circumferential direction and the axial direction at a radial position. In particular, the cooling duct has an outer boundary surface which extends in the circumferential direction and axial direction at a radial position which expediently lies further out than that of the inner boundary surface. The cooling duct typically has side walls which extend in the radial direction and at least one further spatial direction. The side walls are preferably of fluid-tight design.

In the case of the stator housing according to the invention, it is preferred if the heat transfer arrangements each divide the cooling duct into a plurality of partial cooling ducts extending along the direction of flow. Typically, the partial cooling ducts are designed to be fluid-tight with respect to one another. The flow cross sections of the partial cooling ducts formed by a respective heat transfer arrangement are preferably of equal size.

As an advantageous development, provision can be made here for the second heat transfer arrangement to divide the cooling duct into at least two second partial cooling ducts, and for the first heat transfer arrangement to divide the cooling duct into a number of first partial cooling ducts which is at least one greater than the number of the second partial cooling ducts.

In the stator housing according to the invention, it is advantageously envisaged that, in a further section on the inlet side with respect to the second section, the cooling duct has a smaller heat transfer area for the cooling fluid per unit of length based on the direction of flow than in the second section. In particular, the further section is bounded only by the inner boundary surface, the outer boundary surface and the side walls. Typically, the further section directly adjoins the inlet and/or the second section.

In a preferred embodiment of the stator housing according to the invention, it is furthermore envisaged that the first heat transfer arrangement is formed by at least two heat transfer elements and the second heat transfer arrangement is formed by a number of heat transfer elements which is, preferably one, smaller than the number of heat transfer elements of the first heat transfer arrangement.

In order to achieve a fluid-mechanically favorable transition between the sections, provision can be made in this case for the heat transfer elements of the first heat transfer arrangement to be adjoined by expansion elements, which are situated in a transitional section between the first section and the second section and extend toward outer edges of the cooling duct.

Alternatively, a mechanically robust transition can be achieved if the heat transfer element of the second heat transfer arrangement is connected to the heat transfer elements of the first heat transfer arrangement by a branching element, which extends radially less far into the cooling duct in a transitional section between the first section and the second section than the heat transfer elements. It was possible to determine by means of simulations that the mechanical stress and thus the risk of cracks in the stator housing can be considerably reduced by means of the branching element. The branching element is expediently of Y-shaped design and/or the cooling fluid can flow over it.

By means of the branching element, it is advantageously possible to achieve lower mechanical stresses in the stator housing for given manufacturing tolerances, or to achieve higher manufacturing tolerances and a higher transmissible moment at a press fit connecting the stator housing to the stator for given maximum permissible mechanical stresses. It is furthermore possible to allow higher manufacturing tolerances for given maximum permissible mechanical stresses, which reduces manufacturing effort and costs.

The branching element preferably has at least 0.1 times, preferably at least 0.25 times, particularly preferably 0.4 times, and/or at most 0.9 times, preferably at most 0.75 times, particularly preferably 0.6 times, the radial extent of the heat transfer elements.

According to a preferred design alternative, it is envisaged that the heat transfer elements extend continuously along the respective section.

As an alternative to this, a respective heat transfer arrangement is formed by a plurality of heat transfer units comprising at least one heat transfer element, which heat transfer units extend in sections along the respective section, forming interruptions between two adjacent heat transfer units.

The principle according to the invention can be used in a multiplicity of cooling duct architectures:

Thus, in a preferred configuration of the stator housing according to the invention, it is envisaged that the cooling duct extends helically in the circumferential direction of the stator housing. Such a design of the stator housing, also referred to as a helical design, typically achieves the same orientation of the direction of flow over the entire length of the cooling duct. In this case, longitudinal zones of the cooling duct preferably run only in the circumferential direction, with axially adjacent longitudinal zones being connected by offset zones, in which the direction of flow runs in the circumferential and axial directions. The first section and/or the second section and/or the further section can extend both within longitudinal zones and within offset zones.

According to an alternative configuration of the stator housing according to the invention, provision is made for the cooling duct to be formed in a meander shape by a plurality of main zones extending in the circumferential direction or in the axial direction and deflection zones which connect adjacent main zones. Here, therefore, there is a change in the orientation of the direction of flow at the transition from one main zone to an adjacent main zone. Typically, each deflection zone ensures a change in direction of the cooling fluid of at least 170° and/or at most 190°.

In this case, it is particularly preferred if at least one heat transfer unit is arranged in each main zone. In particular, provision can be made for the interruptions to extend completely along the deflection zones.

In the case of the stator housing according to the invention, it is furthermore preferred if the cooling duct is formed by a cavity in the stator housing.

According to a preferred configuration of the stator housing, it is envisaged here that it comprises an inner housing element and an outer housing element, wherein the inner housing element is arranged coaxially within the outer housing element, wherein the cavity is formed in the inner housing element and/or in the outer housing element.

The object on which the invention is based is furthermore achieved by an electrical machine for a vehicle, comprising a stator housing according to the invention and a stator arranged within the stator housing.

Further advantages and details of the present invention emerge from the exemplary embodiments described below and on the basis of the drawings. These are schematic illustrations in which:

FIG. 1 is a cross-sectional view of an exemplary embodiment of an electrical machine 1.

Figure 1:
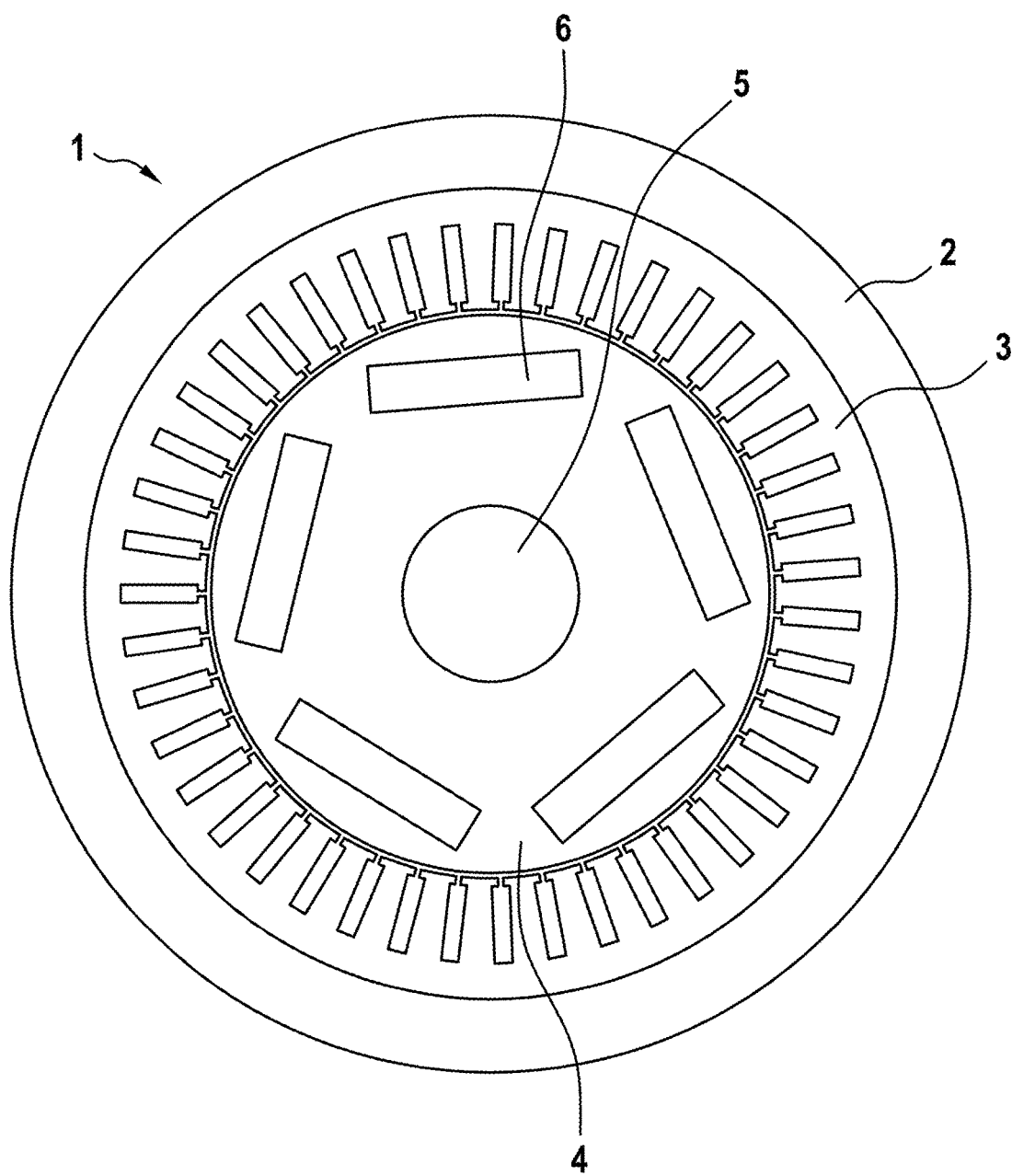
FIG. 1 shows a cross-sectional view of an exemplary embodiment of the electrical machine according to the invention.

The electrical machine 1 comprises a stator housing 2, a stator 3, which is connected to the stator housing 2, for example by means of a press fit, a rotor 4, which is arranged rotatably within the stator 3, and a shaft 5, on which the rotor 4 is secured. By way of example, the rotor 4 comprises a plurality of permanent magnets 6. The stator housing 2 corresponds to one of the exemplary embodiments described below.

Figure 2:
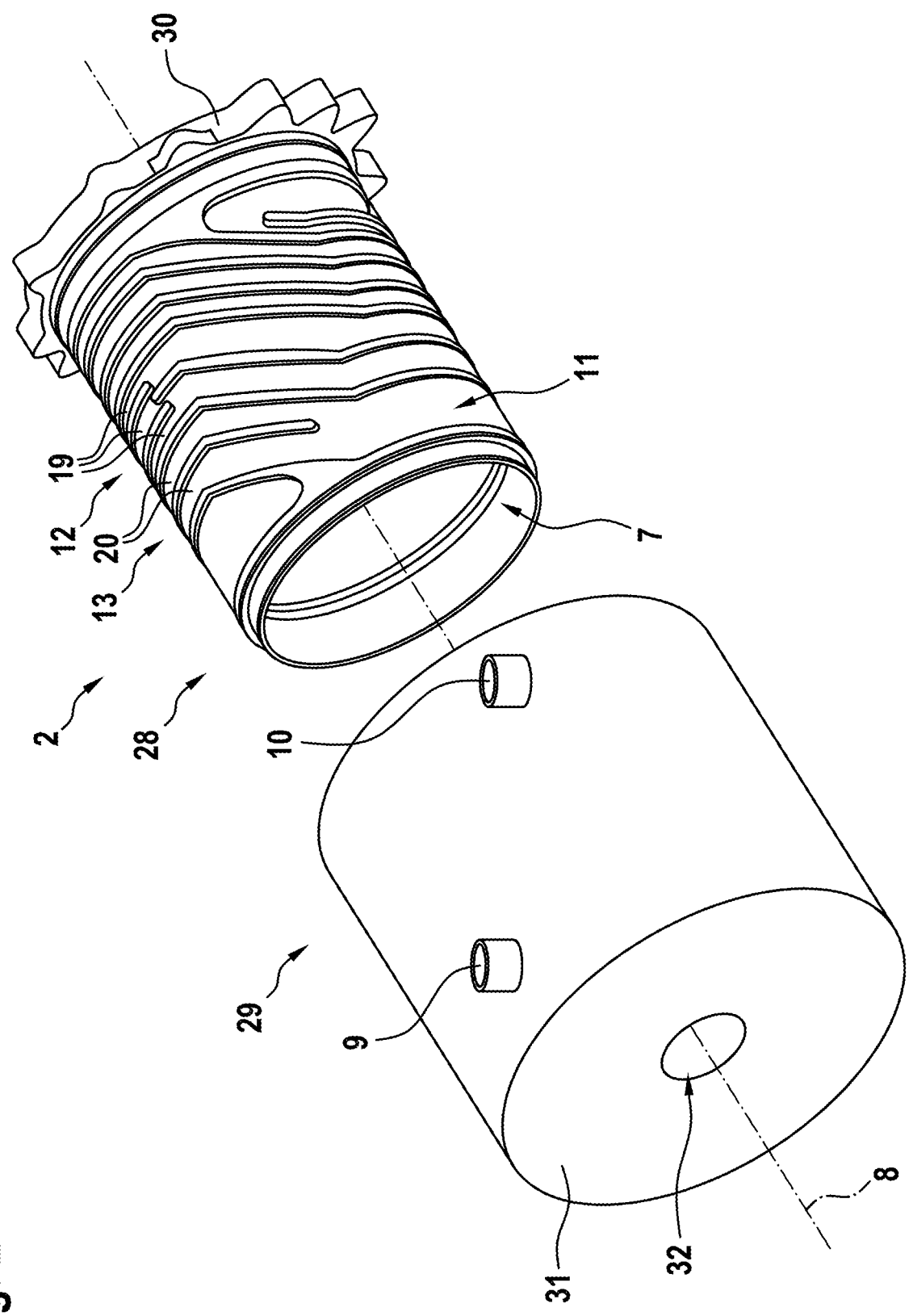
FIG. 2 shows an exploded view of a first exemplary embodiment of the stator housing according to the invention.

FIG. 2 is an exploded view of a first exemplary embodiment of the stator housing 2.

The stator housing 2 houses a cylindrical receiving space 7 having a cylinder axis 8 for the stator 3 (see FIG. 1). The stator housing 2 comprises an inlet 9 for a cooling fluid, an outlet 10 for the cooling fluid, and a cooling duct 11, which is formed between the inlet 9 and the outlet 10 and through which the cooling fluid can flow in a direction of flow directed from the inlet 9 to the outlet 10. By way of example, the inlet 9 and the outlet 10 are formed on opposite axial sides on a lateral surface of the stator housing 2.

The cooling duct 11 has a first heat transfer arrangement 12 and a second heat transfer arrangement 13, which each extend along the direction of flow and are designed for heat transfer from the cooling fluid to the stator housing 2.

Figure 3:
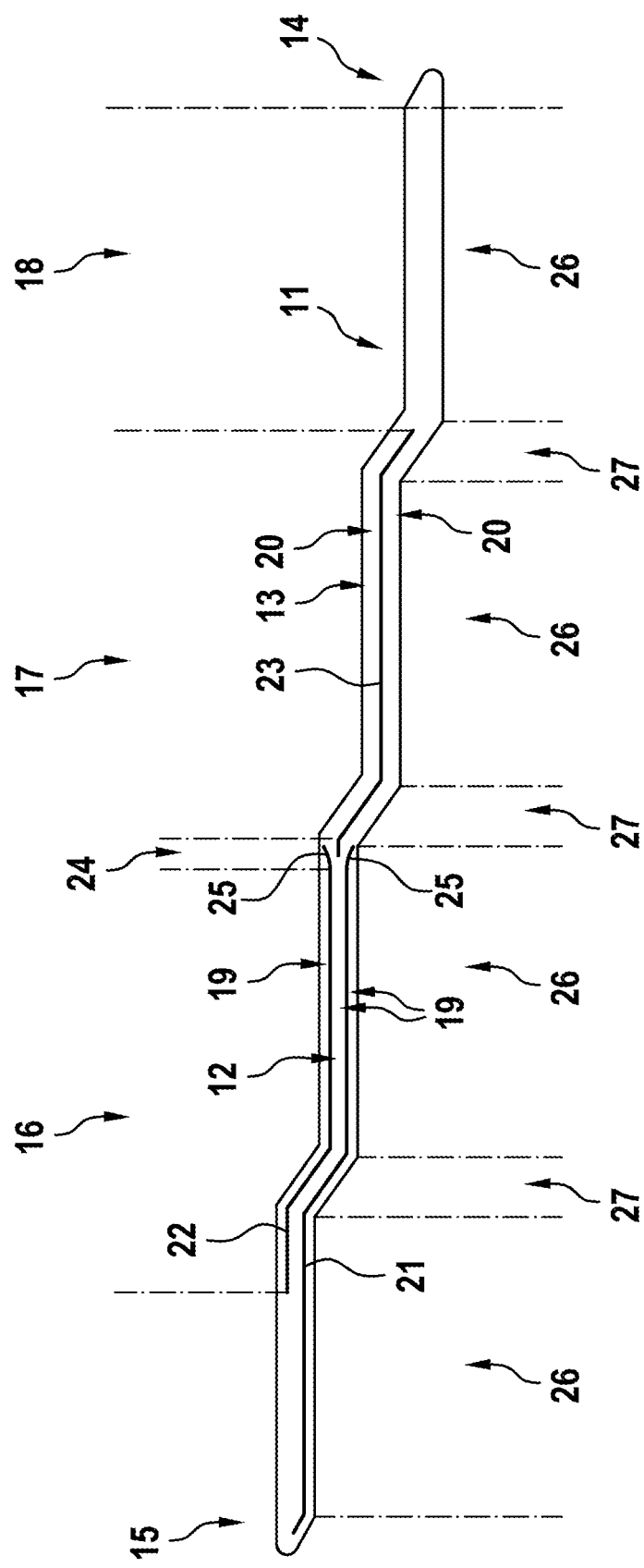
FIG. 3 shows a planar projection of a cooling duct of the first exemplary embodiment of the stator housing.

FIG. 3 is a planar projection of a cooling duct 11 of the stator housing 2. In this case, the inlet end 14 of the cooling duct 11 is shown on the right and the outlet end 15 of the cooling duct 11 is shown on the left.

The cooling duct 11 comprises a first section 16, in which the first heat transfer arrangement 12 is arranged, and a second section 17, which is arranged on the inlet side with respect to the first section 16 and in which the second heat transfer arrangement 13 is arranged. In this case, the first heat transfer arrangement 12 in the first section 16 creates a larger heat transfer area for the cooling fluid per unit of length based on the direction of flow than the second heat transfer arrangement 13 in the second section 17. In addition, the cooling duct 11 comprises a third section 18, which is situated on the inlet side with respect to the second section 17. In the third section 18, the cooling duct 11 has a smaller heat transfer area for the cooling fluid per unit of length based on the direction of flow than in the second section 17.

During operation of the electrical machine 1, the cooling fluid heats up while flowing through the cooling duct 11, and therefore already heated cooling fluid flows on the outlet side. Owing to the fact that the heat transfer area in the first section 16 is larger than in the second section 17 and this in turn is larger in the second section 17 than in the third section 18, axial temperature distribution across the stator housing 2 is substantially more uniform in comparison with a stator housing without heat transfer arrangements, that is to say with a heat transfer area which is substantially constant over the entire length of the cooling duct.

In this case, the cooling duct 11 is divided into two partial cooling ducts 19 by the second heat transfer arrangement 16 and into three partial cooling ducts 20 by the first heat transfer arrangement. The cross-sectional areas of the partial cooling ducts 19 are substantially equal to one another. Likewise, the cross-sectional areas of the partial cooling ducts 20 are substantially equal to one another. Between the respective partial cooling ducts 19, 20, the stator housing 2 is designed to be fluid-tight in the direction perpendicular to the direction of flow, that is to say here in the axial direction.

The first heat transfer arrangement 12 is formed by two heat transfer elements 21, 22, which each extend continuously along the direction of flow in the first section 16. The second heat transfer arrangement 13 is formed by a heat transfer element 23 which extends continuously along the direction of flow in the second section 17. No heat transfer elements are provided in the third section 18.

In a transitional section 24 between the first section 16 and the second section 17, —fundamentally optional—expansion elements 25 are provided, each adjoining a heat transfer element 21, 22 and extending to outer edges of the cooling duct 11. This improves the fluid-mechanical transition between the second section 17 and the first section 16.

In the present exemplary embodiment, the cooling duct 11 extends helically in the circumferential direction of the stator housing 2. For this purpose, the cooling duct 11 has four longitudinal zones 26 in which the direction of flow runs in the circumferential direction, and three offset zones 27, which connect adjacent longitudinal zones 26 and in which the direction of flow runs in the circumferential and axial directions.

FIG. 2 furthermore shows that the stator housing 2 comprises an inner housing element 28 and an outer housing element 29. The housing elements 28, 29 are arranged coaxially with one another in such a way that they completely delimit the cooling duct 11 when the inner housing element 28 is pushed into the outer housing element 29. In this case, side walls and a radially inner boundary surface of the cooling duct 11 are formed by a cavity in the inner housing element 28, whereas the outer housing element 29 has a smooth inner surface, which forms a radially outer boundary surface of the cooling duct 11. As can be seen, the inlet 9 and the outlet 10 are provided on a lateral surface of the outer housing element 29.

Each housing element 28, 29 furthermore has a bearing plate 30, 31 with a through-opening 32 for the shaft 5 (see FIG. 1).

Figure 4:
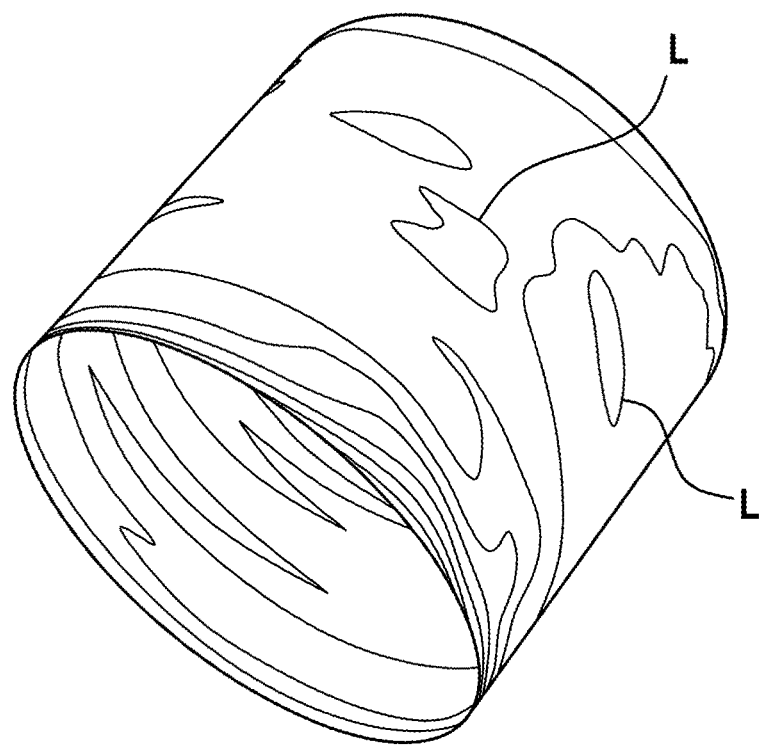
FIG. 4 shows a temperature distribution at a press fit of the stator housing according to the first exemplary embodiment during operation.
Figure 5:
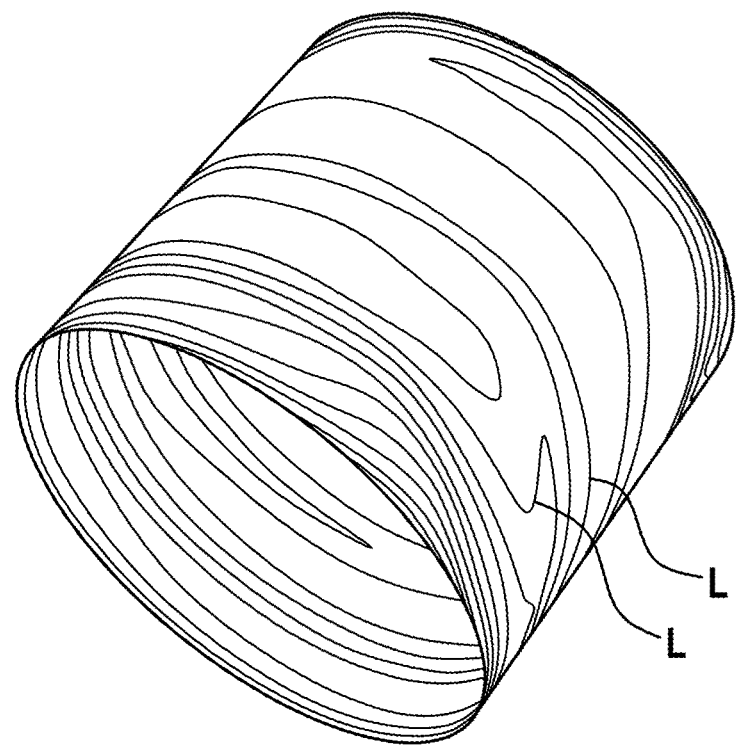
FIG. 5 shows a temperature distribution at a press fit of a conventional stator housing during operation.

FIG. 4 shows a temperature distribution at the press fit of the stator housing 2 during operation of the electrical machine 1. FIG. 5 shows a temperature distribution at the press fit of a conventional stator housing without heat transfer arrangements. In this case, isolines L of the temperature are each at an interval of 2 K. As can be seen from a comparison of FIG. 4 and FIG. 5, the isolines L in FIG. 4 are less densely packed, and therefore there is a substantially more uniform temperature distribution in the axial direction than in the case of the conventional stator housing.

The temperature distributions shown are based on a simulation with characteristic values. The following table shows results of the simulation of a pressure drop between the inlet and the outlet, an average surface temperature at the press fit and an average volume temperature in the inner housing element for the conventional stator housing (column A), for the stator housing 2 according to the first exemplary embodiment (column B) and for a stator housing on which the number of longitudinal zones has been increased from four to six compared with the conventional stator housing (column C).

|  | A | B | C |
|---|---|---|---|
| Pressure drop [mbar] | 23.91 | 39.13 | 56.90 |
| Average surface temperature at the press fit [° C.] | 83.80 | 80.59 | 81.35 |
| Average volume temperature of the inner housing element [° C.] | 78.61 | 77.06 | 77.30 |

It can be seen that a significant reduction in the average temperatures with only a slight increase in the pressure drop is achieved by means of the heat transfer arrangements 12, 13. It should be noted that both the temperature reduction and the increase in the pressure drop are more advantageous in the first exemplary embodiment than in the case of a stator housing with an increase in the number of main zones. These results can be transferred qualitatively to the exemplary embodiments described below.

Figure 6:
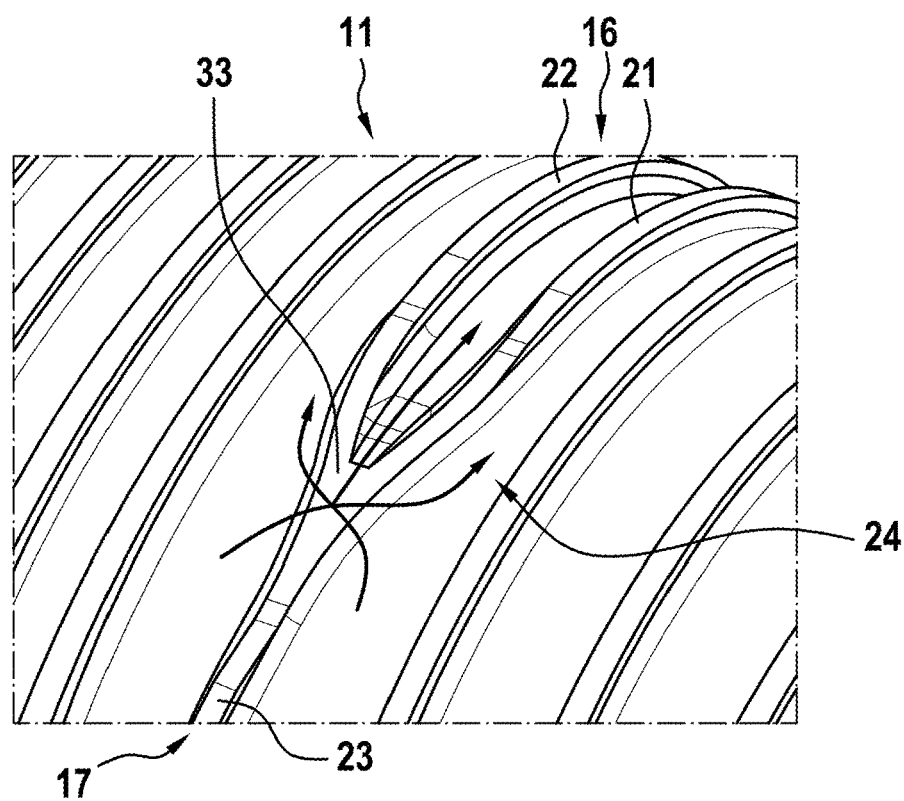
FIG. 6 shows a perspective view of the cooling duct in the region of a transitional section according to a second exemplary embodiment of the stator housing according to the invention.

FIG. 6 is a perspective view of the cooling duct 11 in the region of the transitional section 24 according to a second exemplary embodiment of the stator housing 2, which corresponds to the first exemplary embodiment with the exception of the differences described below.

In this exemplary embodiment, the heat transfer element 23 of the second heat transfer arrangement 13 is connected to the heat transfer elements 21, 22 of the first heat transfer arrangement 12 by a branching element 33. The branching element 33 has a Y shape and extends radially less far outward than the heat transfer elements 21, 22, 23, thus enabling the cooling fluid to flow over it, as indicated by two arrows. By means of the branching element 33, mechanical stresses in the transitional section 24 are considerably reduced compared to the first exemplary embodiment or an exemplary embodiment corresponding to the first exemplary embodiment with a free transitional section. Purely by way of example, the branching element 33 here has half the radial extent of the heat transfer elements 21, 22, 23.

In a simulation, it was possible to determine that, given an assumed heat source of 3 kW at the press fit, an inlet temperature of water as cooling fluid of 70° C. and a volume flow of 10 l·min$^{-1}$, a pressure drop of 128 mbar occurs at an average surface temperature at the press fit of 78.1° C. In the case of a stator housing without a branching element, that is to say a free transitional section 24, a pressure drop which is 5 mbar higher at an average surface temperature at the press fit of 78.0° C. was determined.

From a mechanical point of view, von Mises stresses of the stator housing without a branching element in the transitional section of 184.7 MPa and of 94.6 MPa in the second exemplary embodiment were determined in an exemplary simulation. Tensile stresses can be reduced, as it were, from 210 MPa in the case of the stator housing without a branching element to 101 MPa. In this case, there is no appreciable deviation in the average contact pressure at the press fit between the two stator housings compared here.

Figure 7:
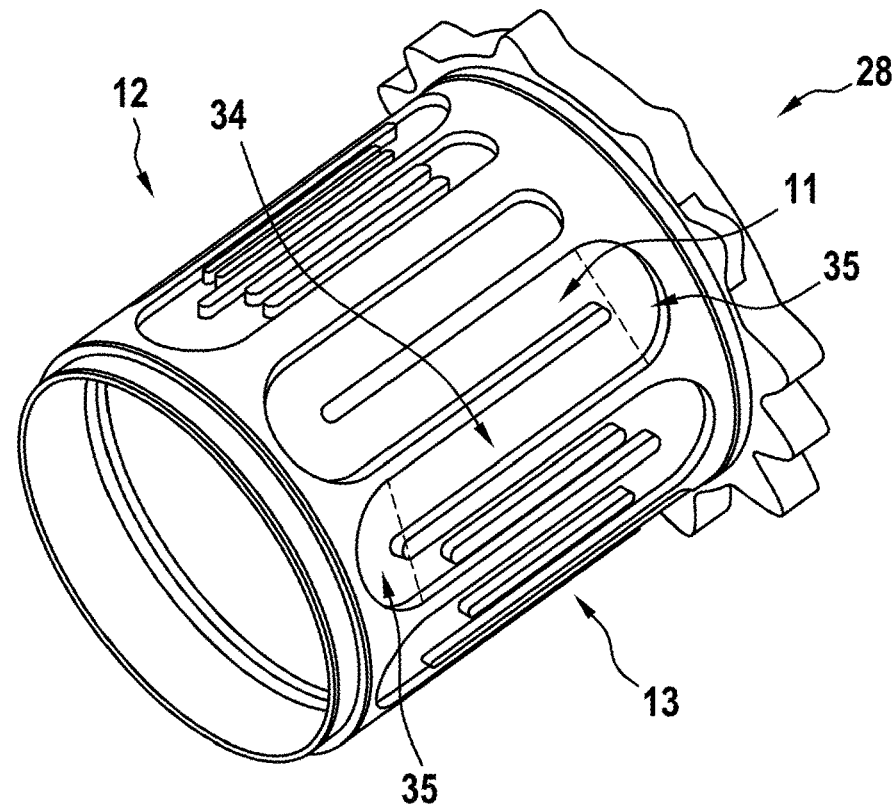
FIG. 7 shows a perspective view of a housing element according to a third exemplary embodiment of the stator housing according to the invention.

FIG. 7 is a perspective view of the inner housing element 28 of a third exemplary embodiment of the stator housing 2, which corresponds to the first exemplary embodiment with the exception of the differences described below.

In the third exemplary embodiment, the cooling duct 11 is formed in a meander shape by a plurality of main zones 34 extending in the axial direction and deflection zones 35 which connect adjacent main zones 34. In this case, the deflection zones bring about a change in the direction of flow by 180°. Here, by way of example, the inlet 9 and the outlet 10 are situated on an axial side of the stator housing 2, in contrast to FIG. 1 and FIG. 2.

Figure 8:
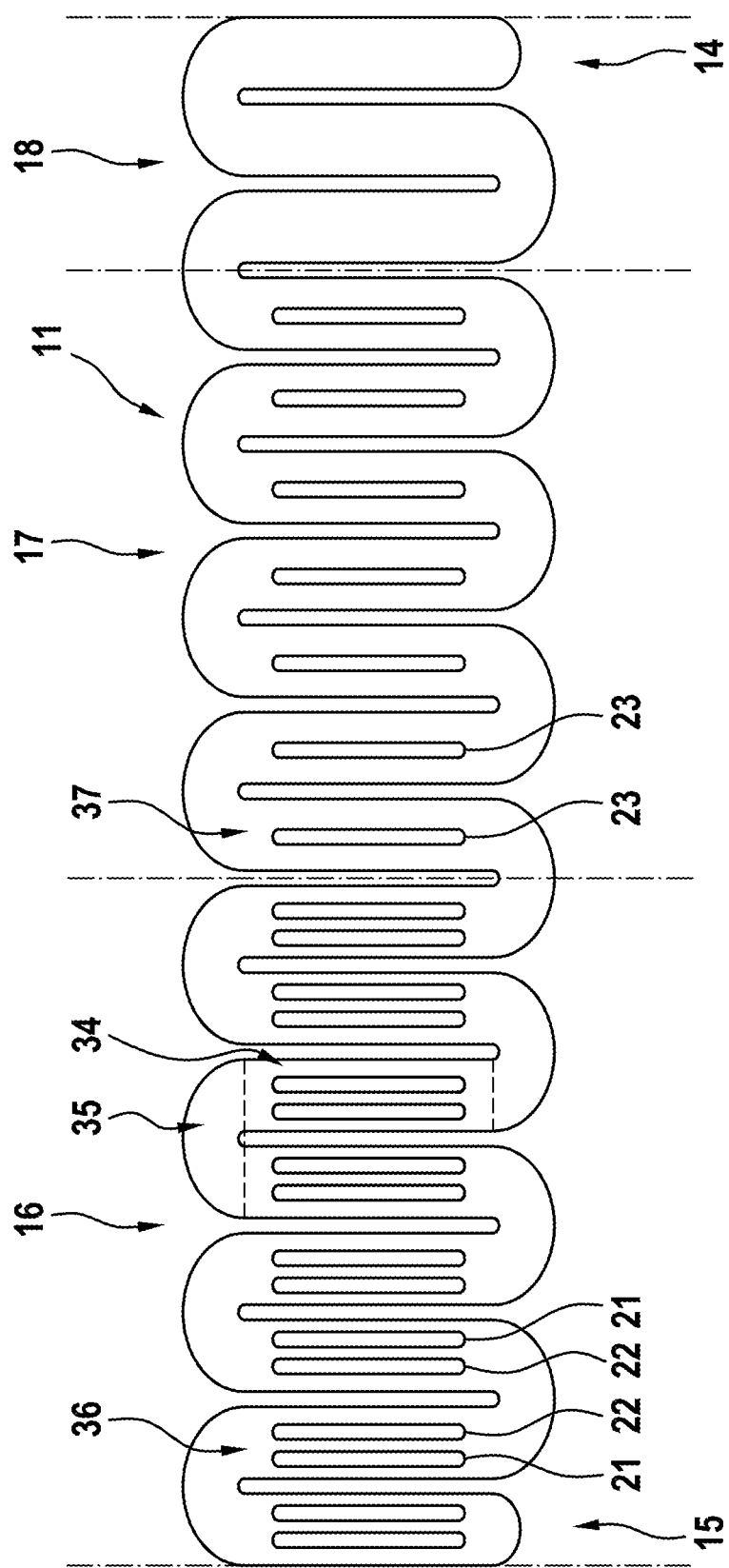
FIG. 8 shows a planar projection of the cooling duct of the third exemplary embodiment.

FIG. 8 shows a planar projection of the cooling duct 11 of the third exemplary embodiment.

The first section 16 extends over eight main zones 34 from the outlet end 15 to the second section 17, which extends over seven main zones 34 as far as the third section 18. This extends over three main zones 34 as far as the inlet end 14.

The first heat transfer arrangement 12 comprises a number of heat transfer units 36 corresponding to the number of main zones 34 along which the first section 16 extends. The heat transfer units 36 comprise the heat transfer elements 21, 22, which extend in the axial direction with interruptions along the first section 16.

The second heat transfer arrangement 13 also comprises a number of heat transfer units 37 corresponding to the number of main zones 34 along which the second section 17 extends. The heat transfer units 37 comprise the heat transfer element 23, which extends with interruptions in the axial direction along the second section 17.

The interruptions are each located in the region of the deflection sections 35.

Figure 9:
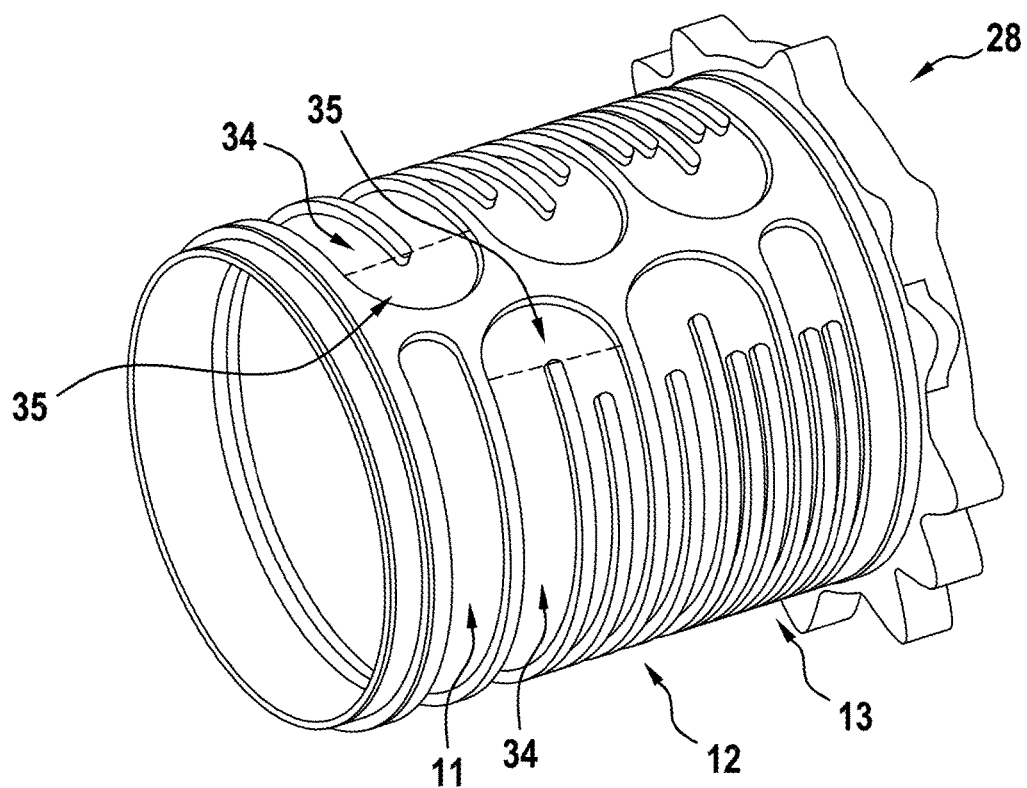
FIG. 9 shows a perspective view of a housing element according to a fourth exemplary embodiment of the stator housing according to the invention.
Figure 10:
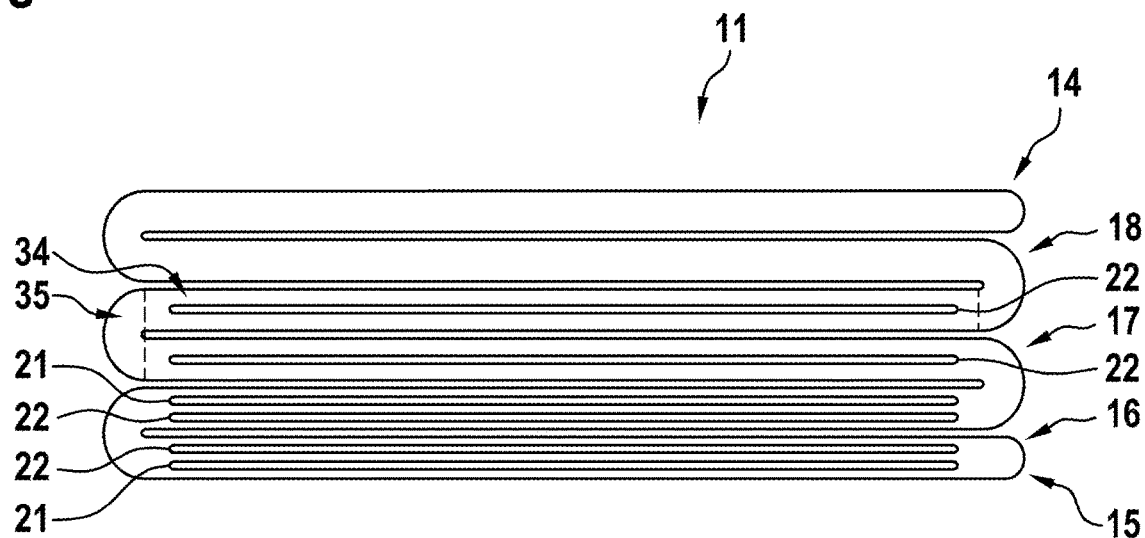
FIG. 10 shows a planar projection of the cooling duct of the fourth exemplary embodiment.

FIG. 9 is a perspective view of the inner housing element 28 of a fourth exemplary embodiment of the stator housing 2, which corresponds to the third exemplary embodiment with the exception of the differences described below.

In the fourth exemplary embodiment, the cooling duct 11 is formed in a meander shape by a plurality of main zones 34, which extend in the circumferential direction and are connected by the deflections zones 35. In this case, the inlet and the outlet lie at the same radial position on opposite axial sides of the stator housing 2 (see FIG. 2). The first section 16 extends over two main zones 34 from the outlet end 15 to the second section 17, which extends over two main zones 34 as far as the third section 18. This extends over two main zones 34 as far as the inlet end 14.

Here, the first heat transfer arrangement 12 comprises two heat transfer units 36 corresponding to the number of main zones 34 along which the first section 16 extends. The heat transfer units 36 comprise the heat transfer elements 21, 22, which extend in the circumferential direction with an interruption along the first section 16.

The second heat transfer arrangement 13 comprises two heat transfer units 37 corresponding to the number of main zones 34 along which the second section 17 extends. The heat transfer units 37 comprise the heat transfer element 23, which extends with an interruption in the circumferential direction along the second section 17.

The invention claimed is:

1. A stator housing for an electrical machine, comprising:
an inlet for a cooling fluid;
an outlet for the cooling fluid;
a cooling duct formed between the inlet and the outlet and through which the cooling fluid flows in a direction of flow directed from the inlet to the outlet,
wherein the cooling duct has a first heat transfer arrangement and a second heat transfer arrangement, which each extend along the direction of flow and are designed to transfer heat from the cooling fluid to the stator housing,
wherein the first heat transfer arrangement is arranged in a first section of the cooling duct and the second heat transfer arrangement is arranged in a second section of the cooling duct that is on the inlet side with respect to the first section,
wherein the first heat transfer arrangement in the first section creates a larger heat transfer area for the cooling fluid per unit of length based on the direction of flow than the second heat transfer arrangement in the second section.

2. The stator housing as claimed in claim 1, wherein the heat transfer arrangements each divide the cooling duct into a plurality of partial cooling ducts extending along the direction of flow.

3. The stator housing as claimed in claim 2, wherein the second heat transfer arrangement divides the cooling duct into at least two second partial cooling ducts, and the first heat transfer arrangement divides the cooling duct into a number of first partial cooling ducts which is at least one greater than the number of the second partial cooling ducts.

4. The stator housing as claimed in claim 1, wherein, in a further section on the inlet side with respect to the second section, the cooling duct has a smaller heat transfer area for the cooling fluid per unit of length based on the direction of flow than in the second section.

5. The stator housing as claimed in claim 1, wherein the first heat transfer arrangement is formed by at least two heat transfer elements and the second heat transfer arrangement is formed by a number of heat transfer elements which is one smaller than the number of heat transfer elements of the first heat transfer arrangement.

6. The stator housing as claimed in claim 5, wherein the heat transfer elements of the first heat transfer arrangement are adjoined by expansion elements, which are situated in a transitional section between the first section and the second section and extend toward outer edges of the cooling duct.

7. The stator housing as claimed in claim 5, wherein the heat transfer element of the second heat transfer arrangement is connected to the heat transfer elements of the first heat transfer arrangement by a branching element, which extends radially less far into the cooling duct in a transitional section between the first section and the second section than the heat transfer elements.

8. The stator housing as claimed in claim 5, wherein the heat transfer elements extend continuously along the respective section.

9. The stator housing as claimed in claim 5, wherein a respective heat transfer arrangement is formed by a plurality of heat transfer units comprising at least one heat transfer element, which heat transfer units extend in sections along the respective section, forming interruptions between two adjacent heat transfer units.

10. The stator housing as claimed in claim 9, wherein the cooling duct extends helically in the circumferential direction of the stator housing.

11. The stator housing as claimed in claim 10, wherein at least one heat transfer unit is arranged in each main zone.

12. The stator housing as claimed in claim 1, wherein the cooling duct is formed in a meander shape by a plurality of main zones extending in the circumferential direction or in the axial direction and deflection zones which connect adjacent main zones.

13. The stator housing as claimed in claim 1 wherein the cooling duct is formed by a cavity in the stator housing.

14. The stator housing as claimed in claim 13, which comprises an inner housing element and an outer housing element, wherein the inner housing element is arranged coaxially within the outer housing element, wherein the cavity is formed in the inner housing element and/or in the outer housing element.

15. An electrical machine for a vehicle, comprising a stator housing as claimed in claim 1 and a stator arranged inside the stator housing.

\* \* \* \* \*